US012700059B2

(12) United States Patent
Kang et al.

(10) Patent No.: US 12,700,059 B2
(45) Date of Patent: *Aug. 4, 2026

(54) SURROUNDINGS MONITORING SYSTEM

(71) Applicant: SL Mirrortech Corporation, Siheug-si
(KR)

(72) Inventors: Moonbong Kang, Siheung-si (KR);
Yuri Kwon, Siheung-si (KR);
Youngnam Shin, Siheung-si (KR);
Mooyeol Lee, Siheung-si (KR);
Chanyeon Lee, Siheung-si (KR);
Changwoo Ha, Siheung-si (KR)

(73) Assignee: SL Mirrortech Corporation,
Siheung-si (KR)

( * ) Notice: Subject to any disclaimer, the term of this
patent is extended or adjusted under 35
U.S.C. 154(b) by 256 days.

This patent is subject to a terminal dis-
claimer.

(21) Appl. No.: 18/667,736

(22) Filed: May 17, 2024

(65) Prior Publication Data

US 2024/0404002 A1 Dec. 5, 2024

(30) Foreign Application Priority Data

Jun. 2, 2023 (KR) ........................ 10-2023-0071550

(51) Int. Cl.
G06T 3/4038 (2024.01)
B60R 1/25 (2022.01)
(Continued)

(52) U.S. Cl.
CPC .............. G06T 3/4038 (2013.01); B60R 1/25
(2022.01); B60R 1/26 (2022.01); G06T 7/11
(2017.01); G06V 10/40 (2022.01)

(58) Field of Classification Search
CPC ..................... G06T 3/4038; G06T 7/11; G06T
2207/30252; G06T 7/33; B60R 1/25;
(Continued)

(56) References Cited

U.S. PATENT DOCUMENTS

2008/0198226 A1* 8/2008 Imamura ................ G06V 20/58
348/148
2019/0191081 A1* 6/2019 Shidochi ................ H04N 23/60
(Continued)

FOREIGN PATENT DOCUMENTS

JP 2019-202584 A 11/2019

OTHER PUBLICATIONS

Lee, Y.; Park, M. Rearview Camera-Based Blind-Spot Detection
and Lane Change Assistance System for Autonomous Vehicles.
Appl. Sci. 2025, 15, 419. https://doi.org/10.3390/app15010419 (Year:
2025).*

(Continued)

*Primary Examiner* — Andrae S Allison
(74) *Attorney, Agent, or Firm* — United One Law Group
LLC; Kongsik Kim; Jhongwoo Peck

(57) ABSTRACT
A system for monitoring surroundings of a vehicle includes
a first imaging device provided on a side of a host vehicle to
generate a first image of side and rear directions of the host
vehicle; a second imaging device provided on a rear of the
host vehicle to generate a second image of the rear direction
of the host vehicle; and a control device configured to
generate a synthesized image by synthesizing a reference
image extracted from the first image and a modified image
extracted from the second image. The control device is
configured to generate the synthesized image in response to
a distance between a counterpart vehicle corresponding to an
object commonly included in the first image and the second
image and the host vehicle becoming less than or equal to a
first threshold distance.

11 Claims, 15 Drawing Sheets

(51) Int. Cl.
  *B60R 1/26*    (2022.01)
  *G06T 7/11*    (2017.01)
  *G06V 10/40*   (2022.01)

(58) Field of Classification Search
  CPC ................ B60R 1/26; B60R 2300/105; B60R
       2300/303; B60R 2300/802; B60R
       2300/108; B60R 2300/304; B60R
     2300/306; G06V 10/40; H04N 5/265;
         H04N 7/181; H04N 23/90
  See application file for complete search history.

(56)      References Cited

U.S. PATENT DOCUMENTS

| | | | |
|---|---|---|---|
| 2020/0053295 A1* | 2/2020 | Asai | H04N 5/272 |
| 2021/0039554 A1* | 2/2021 | Suda | H04N 23/54 |
| 2021/0146836 A1* | 5/2021 | Lee | H04N 23/698 |
| 2021/0225024 A1* | 7/2021 | Yun | B60R 1/27 |
| 2022/0118916 A1* | 4/2022 | Kang | B60R 1/27 |
| 2024/0270172 A1* | 8/2024 | Kim | B60R 1/27 |

OTHER PUBLICATIONS

Ra et al, Part-based vehicle detection in side-rectilinear images for blind-spot detection, Expert Systems With Applications 101 (2018) 116-128 (Year: 2018).*

* cited by examiner

SURROUNDINGS MONITORING SYSTEM

CROSS-REFERENCE TO RELATED APPLICATION

This application claims priority from Korean Patent Application No. 10-2023-0071550 filed on Jun. 2, 2023, which is incorporated herein by reference in its entirety.

BACKGROUND

1. Technical Field

The present disclosure relates to a surroundings monitoring system, and more particularly, to a surroundings monitoring system for a vehicle that provides visual information on the periphery of a host vehicle by synthesizing images generated by a plurality of imaging devices to obtain a rearview that would be otherwise blocked by the host vehicle.

2. Description of the Related Art

In general, a vehicle is equipped with an inside mirror so that a driver may check a rear situation of the vehicle, and is also equipped with outside mirrors on both sides thereof so that the driver may check side and rear situations thereof. The driver checks nearby vehicles or pedestrians during reversing, passing, and lane changes based on the field of view secured by the inside mirror and/or the outside mirror.

Recently, a camera mirror that includes an imaging device (e.g., a camera) instead of an outside mirror is installed in the vehicle to reduce air resistance when the vehicle is being operated and to reduce the possibility of damage due to an external impact. A periphery image of the vehicle, which is acquired by the camera mirror, is displayed through a display device provided inside the vehicle, so that the driver may more easily check the surrounding situation of the vehicle.

Meanwhile, the camera mirror is installed on a front side of the vehicle, and in this case, the host vehicle is included within the field of view of the camera mirror, and the rear view is obstructed by the host vehicle. Accordingly, it may be difficult to monitor where the host vehicle obstructs the view.

Therefore, in providing a peripheral monitoring function using the camera mirror, increasing the monitoring range is desired.

SUMMARY

An object of the present disclosure is to provide a surroundings monitoring system that provides visual information on the periphery of a host vehicle by synthesizing images generated by a plurality of imaging devices to obtain a rear view, which would be otherwise blocked by the host vehicle.

The objects of the present disclosure are not limited to those mentioned above, and additional objects will be clearly understood by those skilled in the art from the following description.

In order to achieve the above object, a surroundings monitoring system for a vehicle according to an embodiment of the present disclosure may include a first imaging device provided on a side of a host vehicle to generate a first image of side and rear directions of the host vehicle; a second imaging device provided on a rear of the host vehicle to generate a second image of the rear direction of the host vehicle; and a control device configured to generate a synthesized image by synthesizing a reference image extracted from the first image and a modified image extracted from the second image. In particular, the control device may be configured to generate the synthesized image in response to a distance between a counterpart vehicle corresponding to an object commonly included in the first image and the second image and the host vehicle becoming less than or equal to a first threshold distance. The control device may be configured to divide an area occupied by a host vehicle image of the host vehicle in the first image into a first modified synthesis area and a second modified synthesis area, to maintain the host vehicle image to be included in the first modified synthesis area, and to map the modified image to the second modified synthesis area.

The control device may include a main image processor configured to extract the reference image and the modified image from the first image and the second image, respectively, and the main image processor may be configured to extract one or more feature points of the object commonly included in the first image and the second image; generate a homography model based on the extracted feature points; convert the second image using the generated homography model; and extract the reference image and the modified image from the first image and the converted second image, respectively.

The control device may be configured to convert the second image to allow the object included in the first image and the object included in the second image to be matched with respect to the counterpart vehicle, and to generate the synthesized image by synthesizing the reference image extracted from the first image and the modified image extracted from the converted second image.

The first modified synthesis area and the second modified synthesis area may be disposed in a vertical direction, and the first modified synthesis area may be disposed below the second modified synthesis area. A vertical position of a boundary between the first modified synthesis area and the second modified synthesis area may be adjusted based on a distance between the counterpart vehicle and the host vehicle.

The control device may be configured to overlay the modified image with the host vehicle image and allow a resulting image to be included in the second modified synthesis area.

The control device may be configured to cut the modified image so that a vehicle outline of the host vehicle image included in the second modified synthesis area is maintained, and to map the cut image to the second modified synthesis area.

The first image and the second image may include at least some areas that are overlapped with each other.

The second imaging device may generate the second image by capturing images of a vicinity of the host vehicle with a wider angle of view than the first imaging device.

In some embodiments, the control device may be configured to stop generating the synthesized image in response to the distance between the counterpart vehicle and the host vehicle becoming less than or equal to a second threshold distance, which is smaller than the first threshold distance.

In some embodiments, in a state in which the synthesis image is being generated, the control device may be configured to maintain generating the synthesized image while the distance between the counterpart vehicle and the host vehicle is greater than or equal to a second threshold distance, which is smaller than the first threshold distance, and less than or equal to a third threshold distance, which is greater than the first threshold distance. Further, the control device may be configured to stop generating the synthesized image in response to the distance becoming smaller than the second threshold distance or greater than the third threshold distance.

According to the embodiment of the present disclosure, the surroundings monitoring system has an advantage of providing visual information regarding the periphery of the host vehicle by synthesizing images generated by a plurality of imaging devices to increase the monitoring range in the periphery of the host vehicle.

Also, the surroundings monitoring system has an advantage in that it reduces the sense of heterogeneity that may occur at the boundary of images as an image to be used is selected based on the distance from the subject in generating a synthesized image.

The advantages according to the embodiment of the present disclosure are not limited to those mentioned above, and various other advantages are to be understood from the following description of the present disclosure.

BRIEF DESCRIPTION OF THE DRAWINGS

The above and other aspects and features of the present disclosure will become more apparent by describing in detail non-limiting example embodiments with reference to the attached drawings, in which.

DETAILED DESCRIPTION

Figure 1:
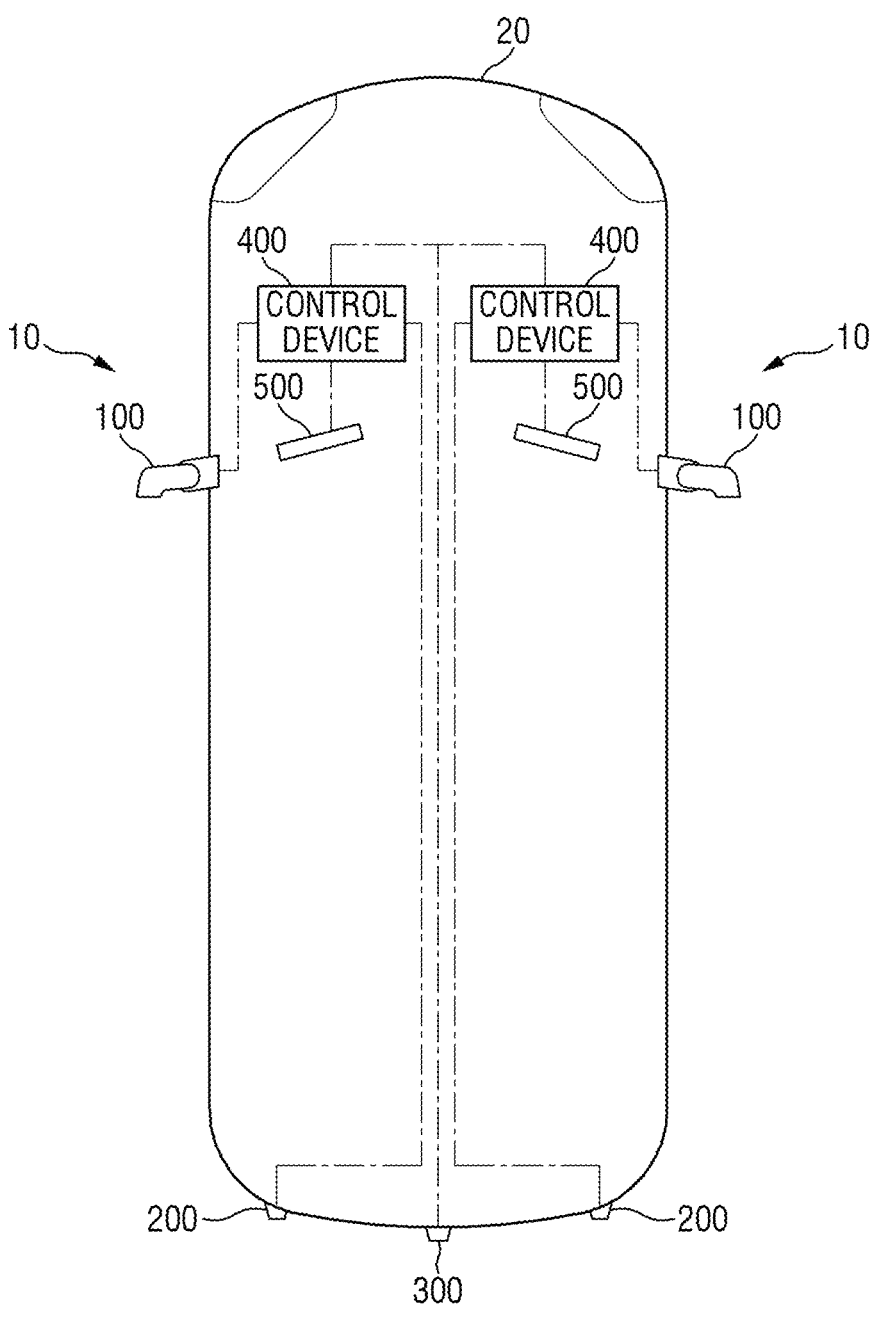
FIG. 1 illustrates a host vehicle equipped with a surroundings monitoring system according to an embodiment of the present disclosure.

Hereinafter, non-limiting example embodiments of the present disclosure will be described in detail with reference to the accompanying drawings. Advantages and features of embodiments of the present disclosure will be apparent with reference to the non-limiting example embodiments described in detail below together with the accompanying drawings. However, the present disclosure is not limited to the example embodiments described below, and embodiments of the present disclosure may be implemented in various different forms. The example embodiments are described to make the present disclosure complete, and to fully inform the scope of the present disclosure to those of ordinary skill in the technical field to which the present disclosure belongs. The same reference numerals refer to the same components throughout the specification.

It will be understood that when an element is referred to as being "on," "connected to," or "coupled to" another element, it can be directly on, connected to, or coupled to the other element or intervening elements may be present. In contrast, when an element is referred to as being "directly on," "directly connected to," or "directly coupled to" another element, there are no intervening elements present.

Unless otherwise defined, all terms (including technical and scientific terms) used in the present disclosure may have meanings that are commonly understood by those of ordinary skill in the art to which the present disclosure belongs. In addition, terms defined in a commonly used dictionary are not to be interpreted overly ideally or excessively unless explicitly defined specifically.

Figure 2:
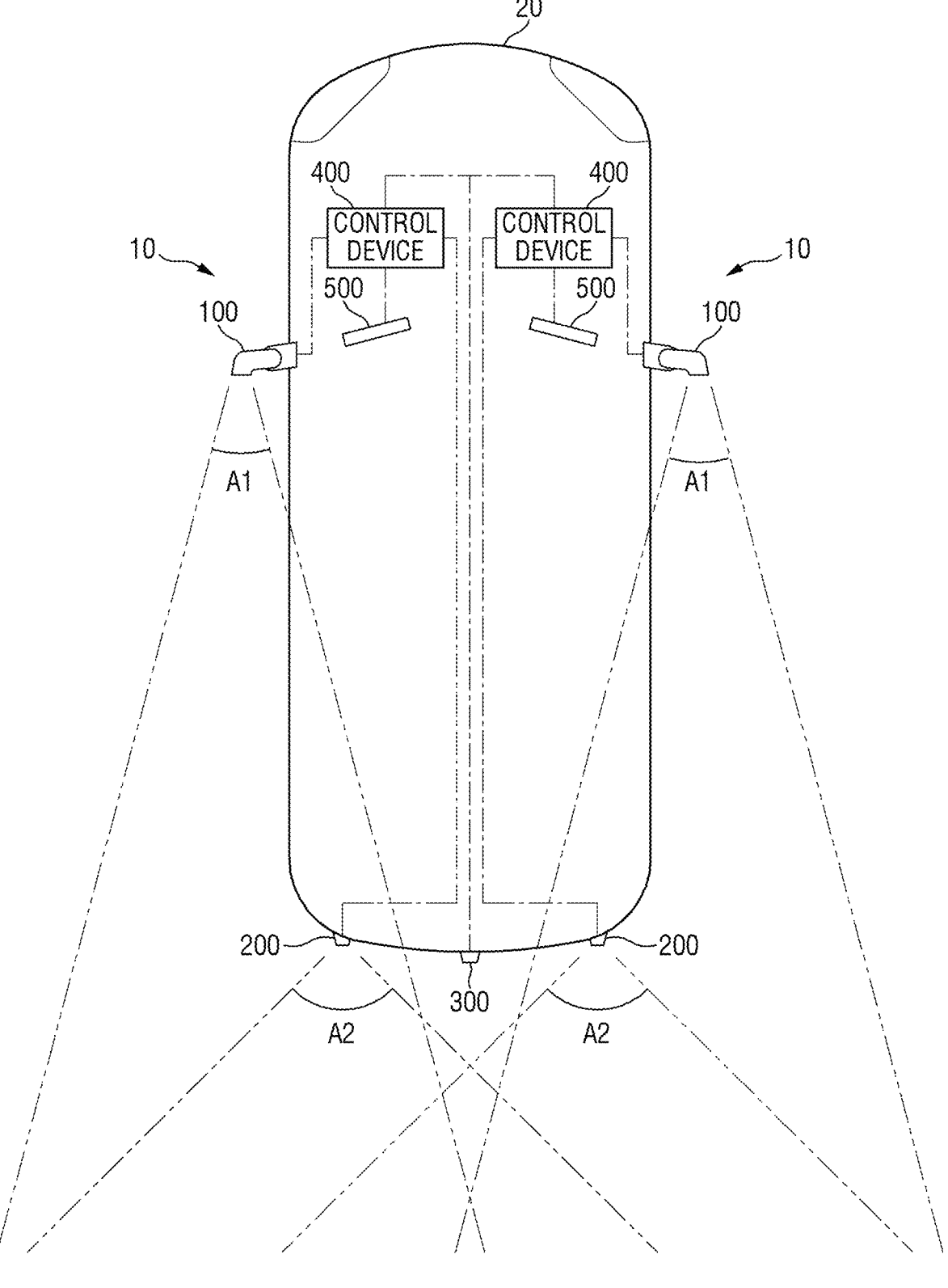
FIG. 2 illustrates monitoring ranges of first and second imaging devices.

FIG. 1 illustrates a host vehicle equipped with a surroundings monitoring system according to an embodiment of the present disclosure, and FIG. 2 illustrates monitoring ranges of first and second imaging devices.

Referring to FIGS. 1 and 2, a surroundings monitoring system 10 according to an embodiment of the present disclosure may be provided in a host vehicle 20.

The surroundings monitoring system 10 may include a first imaging device 100 (e.g., a first camera), a second imaging device 200 (e.g., a second camera), an auxiliary sensor 300, a controller 400 (e.g., a control device, a control unit, a processor, or a processing unit), and a display device 500.

The imaging devices 100 and 200 may each generate an image of a subject. For example, the imaging devices 100 and 200 may include an image sensor such as a charge coupled device (CCD) or a complementary metal oxide semiconductor (CMOS). Light that is input to the imaging devices 100 and 200 may be detected by the image sensor, and the detected light may be converted into electrical signals to generate a digital image. The image generated by the imaging devices 100 and 200 may be a still image or a moving image.

The imaging devices 100 and 200 may include a first imaging device 100 and a second imaging device 200. The first imaging device 100 may be provided on a side of the host vehicle 20 to generate a first image of side and rear directions of the host vehicle 20. The host vehicle 20 may include a first imaging device 100 instead of a side mirror. A driver may check the side and rear directions of the host vehicle 20 using the image generated by the first imaging device 100. The first image may include visual information having a field of view (FOV) according to the laws and regulations that regulate the side mirror.

The second imaging device 200 may be provided on a rear end of the host vehicle 20 to generate a second image of the rear of the host vehicle 20. In some embodiments, the second image may be an image used when the host vehicle 20 is reversing.

One set of the first imaging device 100 and the second imaging device 200 may be provided on each of left and right sides of the host vehicle 20. In other words, the first imaging device 100 may be provided on the left side of the host vehicle 20, and the second imaging device 200 may be provided on the left rear side of the host vehicle 20. Further, another first imaging device 100 may be provided on the right side of the host vehicle 20, and another second imaging device 200 may be provided on the right rear side of the vehicle 20.

The first imaging device 100 and the second imaging device 200 may capture images of the periphery of the host vehicle 20 with different angles of view A1 and A2. As shown in FIG. 2, the second imaging device 200 may generate the second image by capturing the images of the periphery of the host vehicle 20 at a larger angle of view than the first imaging device 100. For example, the first imaging device 100 may capture images of the periphery of the host vehicle 20 using a narrow angle lens, and the second imaging device 200 may capture images of the periphery of the host vehicle 20 using a wide angle lens. Therefore, the second image may include peripheral information for a wider range than the first image.

The auxiliary sensor 300 may be provided in the host vehicle 20 to generate a third image of the rear of the host vehicle 20. The auxiliary sensor 300 may be provided on the rear end of the host vehicle 20, or may be provided on an upper surface of the host vehicle 20. The auxiliary sensor 300 may be provided at various points of the host vehicle 20, which are capable of monitoring the rear of the host vehicle 20.

The auxiliary sensor 300 may generate the third image by sensing the periphery of the host vehicle 20 with a wider angle of view than the first imaging device 100 and the second imaging device 200. For example, the auxiliary sensor 300 may sense the periphery of the host vehicle 20 using a wide angle lens having an even wider angle of view than the second imaging device 200. In some embodiments, the auxiliary sensor 300 may sense the periphery of the host vehicle 20 using a fisheye lens.

In the present disclosure, the auxiliary sensor 300 may include at least one of an image sensor, a light detection and ranging (LiDAR) sensor, or a radio detection and ranging (RADAR) sensor. The above-described third image may be generated by the image sensor, or may be generated by converting signals detected by the LiDAR sensor or the RADAR sensor into a two-dimensional (2D) image.

The control device 400 may be configured to transfer the images generated by the first imaging device 100 and the second imaging device 200 to the display device 500. The display device 500 may output the images transferred from the control device 400. When the display device 500 outputs the first image, the driver may check the side and rear situations of the host vehicle 20. When the display device 500 outputs the second image, the driver may check the rear situations of the host vehicle 20.

The control device 400 may be configured to generate a synthesized image by combining the first image and the second image and transfer the synthesized image to the display device 500. Alternatively, the control device 400 may be configured to transfer only one of the first image or the second image to the display device 500. As will be described below, the control device 400 may be configured to determine whether to generate the synthesized image depending on a distance between the host vehicle 20 and a counterpart vehicle 30 (see FIG. 14).

As shown in FIG. 2, the host vehicle 20, or a portion thereof, may be included within the monitoring range of the first imaging device 100. In this case, since the host vehicle 20 obstructs the rear view in the first image, the driver may be unable to check the peripheral view of the host vehicle 20, where it corresponds to the portion occupied by the host vehicle in the first image. On the other hand, the second image may include image information that is not included in the first image, and the control device 400 may be configured to generate the synthesized image by combining the corresponding image information to the first image. Accordingly, the driver may check information on the rear as well as the side-rear of the host vehicle 20 owing to the synthesized image.

FIGS. 1 and 2 show an example where the control device 400 for processing images of the first imaging device 100 and the second imaging device 200, which are provided on the left side of the host vehicle 20 and the control device 400 for processing images of the first imaging device 100 and the second imaging device 200, which are provided on the right side of the host vehicle 20, are separately provided. However, this configuration is only exemplary. According to some embodiments of the present disclosure, a single control device 400, or a plurality of control devices configured to collectively perform as one logical control device, may be configured to process the images of the first imaging device 100 and the second imaging device 200, which are provided on the left and right sides of the host vehicle 20.

In addition, FIGS. 1 and 2 show an example where the display device 500 for displaying images of the first imaging device 100 and the second imaging device 200, which are provided on the left side of the host vehicle 20, and the display device 500 for displaying images of the first imaging device 100 and the second imaging device 200, which are provided on the right side of the host vehicle 20, are separately provided. However, this configuration is only exemplary. According to some embodiments of the present disclosure, a single display device 500 may display the images of the first imaging device 100 and the second imaging device 200, which are provided on the left and right sides of the host vehicle 20.

Figure 3:
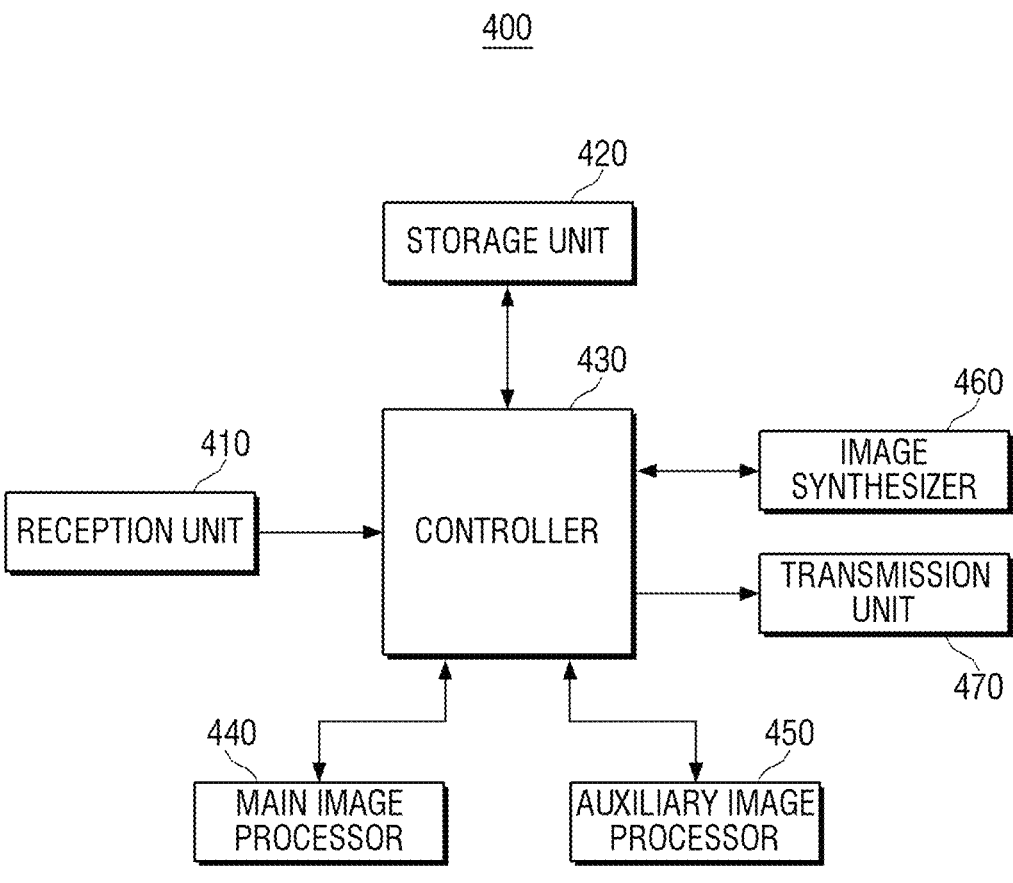
FIG. 3 is a block diagram of a control device according to an embodiment of the present disclosure.

FIG. 3 is a block diagram of the control device 400. Referring to FIG. 3, the control device 400 may include a reception unit 410, a storage unit 420, a controller 430, a main image processor 440, an auxiliary image processor 450, an image synthesizer 460, and a transmission unit 470.

As used herein, the term "unit" may mean computer software or a computer implemented software module performing the functions and processes described herein. Additionally, the term "unit" may also refer to a hardware device that includes a memory and a processor. The memory may be configured to store the modules, and the processor may be configured to execute said modules to perform one or more processes which are described herein.

The reception unit 410 may be configured to receive images from the first imaging device 100, the second imaging device 200, and the auxiliary sensor 300. To this end, the reception unit 410 may perform wired or wireless communication with the first imaging device 100, the second imaging device 200, and the auxiliary sensor 300. The reception unit 410 may be configured to receive the first image, the second image, and the third image in real time through communication with the first imaging device 100, the second imaging device 200, and the auxiliary sensor 300.

The storage unit 420 may temporarily or permanently store the first image, the second image, and the third image, which are received through the reception unit 410. Also, the storage unit 420 may temporarily or permanently store data necessary for the operation of the control device 400. In some embodiment, the storage unit 420 may include volatile or non-volatile memory devices, and/or computer readable recording media implemented with magnetic or optical technologies.

The main image processor 440 may be configured to extract a synthesis base image, which becomes the basis for the synthesized image, from the first image and the second image. In this case, the first image may include visual information having the field of view (FOV) according to the laws and regulations that govern the side mirror. The main image processor 440 may be configured to extract the synthesis base image from each of the first image and the second image. Hereinafter, the synthesis base image extracted from the first image will be referred to as a reference image, and the synthesis base image extracted from the second image will be referred to as a modified image.

The auxiliary image processor 450 may be configured to extract an auxiliary image from the third image. The auxiliary image may be used to determine a distance to a subject that is present behind the host vehicle 20.

The image synthesizer 460 may be configured to generate a synthesized image by synthesizing the reference image extracted from the first image and the modified image extracted from the second image. A detailed description regarding the generation of the synthesized image will be described later below with reference to FIG. 8.

The transmission unit 470 may be configured to transmit the synthesized image generated by the image synthesizer 460 to the display device 500. To this end, the transmission unit 470 may perform wired or wireless communication with the display device 500. The display device 500 may display the synthesized image received from the transmission unit 470.

The controller 430 may be configured to perform overall control for the reception unit 410, the storage unit 420, the main image processor 440, the auxiliary image processor 450, the image synthesizer 460, and the transmission unit 470.

Figure 4:
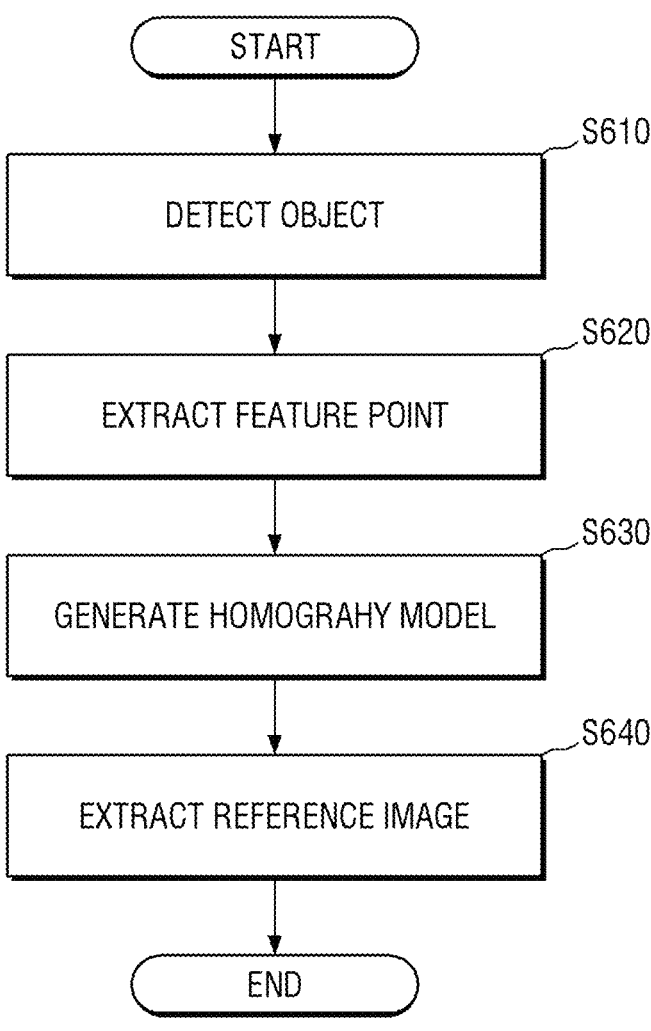
FIG. 4 is a flow chart illustrating processes performed by a main image processor.

FIG. 4 is a flow chart illustrating processes performed by the main image processor 440. Referring to FIG. 4, the main image processor 440 may be configured to extract a reference image and a modified image from the first image and the second image, respectively. Hereinafter, the first image and the second image, which are received from the reception unit 410, will be referred to as original images.

To extract the reference image, the main image processor 440 may be configured to first detect an object from the original images (S610). The main image processor 440 may be configured to detect an object from the original images using one or more artificial intelligence algorithms. For example, the main image processor 440 may be configured to use a You Only Look Once (YOLO) algorithm as an artificial intelligence algorithm. As will be described later, whether to generate a synthesized image may be determined depending on the distance between the host vehicle 20 and the counterpart vehicle 30. Likewise, whether to detect an object from the original images may be determined depending on the distance between the host vehicle 20 and the counterpart vehicle 30.

In the present disclosure, the object detected by the main image processor 440 may be an image of an adjacent vehicle present in the vicinity of the host vehicle 20. However, it is exemplary that the object detected by the main image processor 440 is the image of an adjacent vehicle, and according to some embodiments of the present disclosure, the object detected by the main image processor 440 may be an image of various things, which provide position information of the host vehicle 20 relative thereto, such as a person, a building, a tree, and a road.

Further, the main image processor 440 may be configured to extract one or more feature points from the object (S620). For example, the main image processor 440 may be configured to extract one or more feature points from the object by using a Harris Corner detection scheme or a Shi & Tomasi detection scheme.

The extraction of the feature points may be performed for each of the object included in the first image and the object included in the second image. Hereinafter, the feature point of the object included in the first image will be referred to as a first feature point, and the feature point of the object included in the second image will be referred to as a second feature point.

Further, the main image processor 440 may be configured to generate a homography model by using the feature point (S630). In this step, the main image processor 440 may be configured to generate a model indicating a correspondence relationship between the first feature point and the second feature point.

Further, the main image processor 440 may be configured to convert at least one of the first image or the second image by using the homography model. For example, the main image processor 440 may be configured to convert the second image by using the homography model. In this case, the object included in the second image may be displayed in the same posture as the object included in the first image. Hereinafter, the following description will be based on an example that the main image processor 440 converts the second image by using the homography model. However, the present disclosure is not limited thereto, and the main image processor 440 may convert the first image based on the homography model as well.

Further, the main image processor 440 may be configured to extract a synthesis base image from the original images (S640). In other words, the main image processor 440 may be configured to extract the reference image from the first image and extract the modified image from the second image. For example, the reference image may include an entire area of the first image, and the modified image may include a partial area of the second image, which corresponds to the area obstructed by the host vehicle image with respect to the host vehicle 20 in the first image. Alternatively, the reference image may include a partial area of the first image excluding the area obstructed by the host vehicle image with respect to the host vehicle 20 in the first image, or may include a portion of the host vehicle image.

Figure 5:
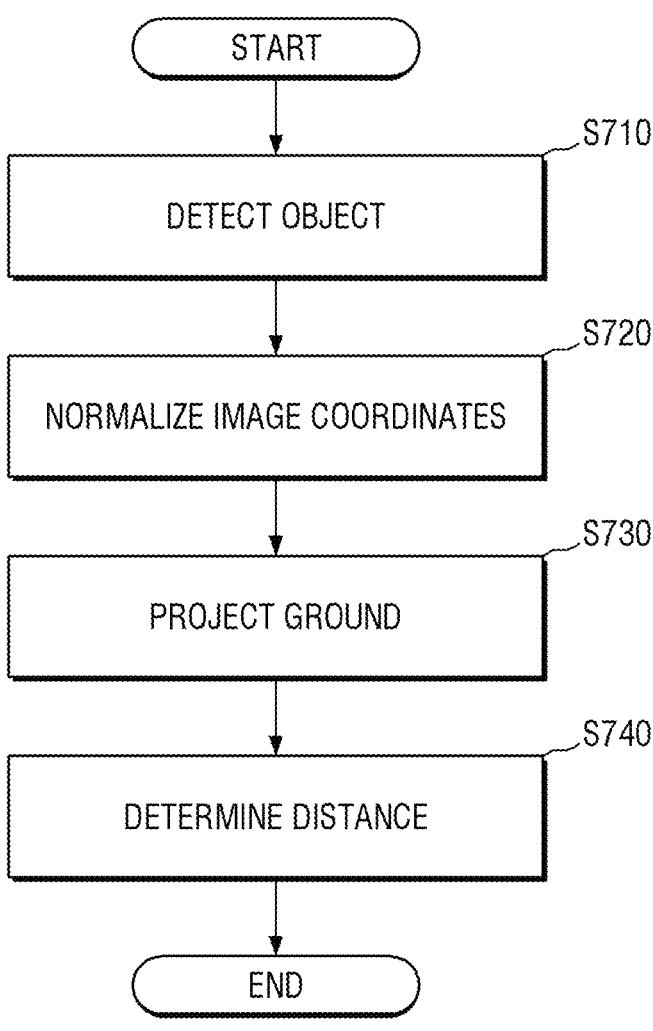
FIG. 5 is a flow chart illustrating processes performed by an auxiliary image processor.

FIG. 5 is a flow chart illustrating processes performed by the auxiliary image processor 450. Referring to FIG. 5, the auxiliary image processor 450 may be configured to determine a distance to an element corresponding to the object included in the third image.

As will be described later, whether to generate a synthesized image may be determined depending on the distance between the host vehicle 20 and the counterpart vehicle 30. Likewise, whether to generate a third image and whether to determine a distance to a thing may be determined depending on the distance between the host vehicle 20 and the counterpart vehicle 30.

To determine the distance to the element corresponding to the object included in the third image, the auxiliary image processor 450 may be configured to first detect the object from the third image (S710). The auxiliary image processor 450 may be configured to detect the object from the third image using one or more artificial intelligence algorithms. For example, the auxiliary image processor 450 may be configured to use a You Only Look Once (YOLO) algorithm as an artificial intelligence algorithm.

In the present disclosure, the object detected by the auxiliary image processor 450 may be an image of an adjacent vehicle present in the vicinity of the host vehicle 20. However, it is exemplary that the object detected by the auxiliary image processor 450 is the image of the adjacent vehicle, and according to some embodiments of the present disclosure, the object detected by the auxiliary image processor 450 may be an image of various things, which provide position information of the host vehicle 20 relative thereto, such as a person, a building, a tree, and a road.

Further, the auxiliary image processor 450 may be configured to normalize coordinates of the third image so that the object included in the first image is matched with the object included in the third image (S720). Alternatively, the auxiliary image processor 450 may be configured to normalize the coordinates of the third image so that the object included in the second image converted using the homography model and the object included in the third image are matched with each other. Accordingly, the object included in the third image may be displayed in the same posture as the object included in the first image or in the converted second image.

Further, the auxiliary image processor 450 may be configured to perform ground projection with respect to the object included in the normalized third image (S730). The coordinates of the object projected on the ground may be calculated via the ground projection.

Further, the auxiliary image processor 450 may be configured to determine the distance to the element corresponding to the corresponding object by referring to the coordinates of the object projected on the ground (S740).

Figure 6:
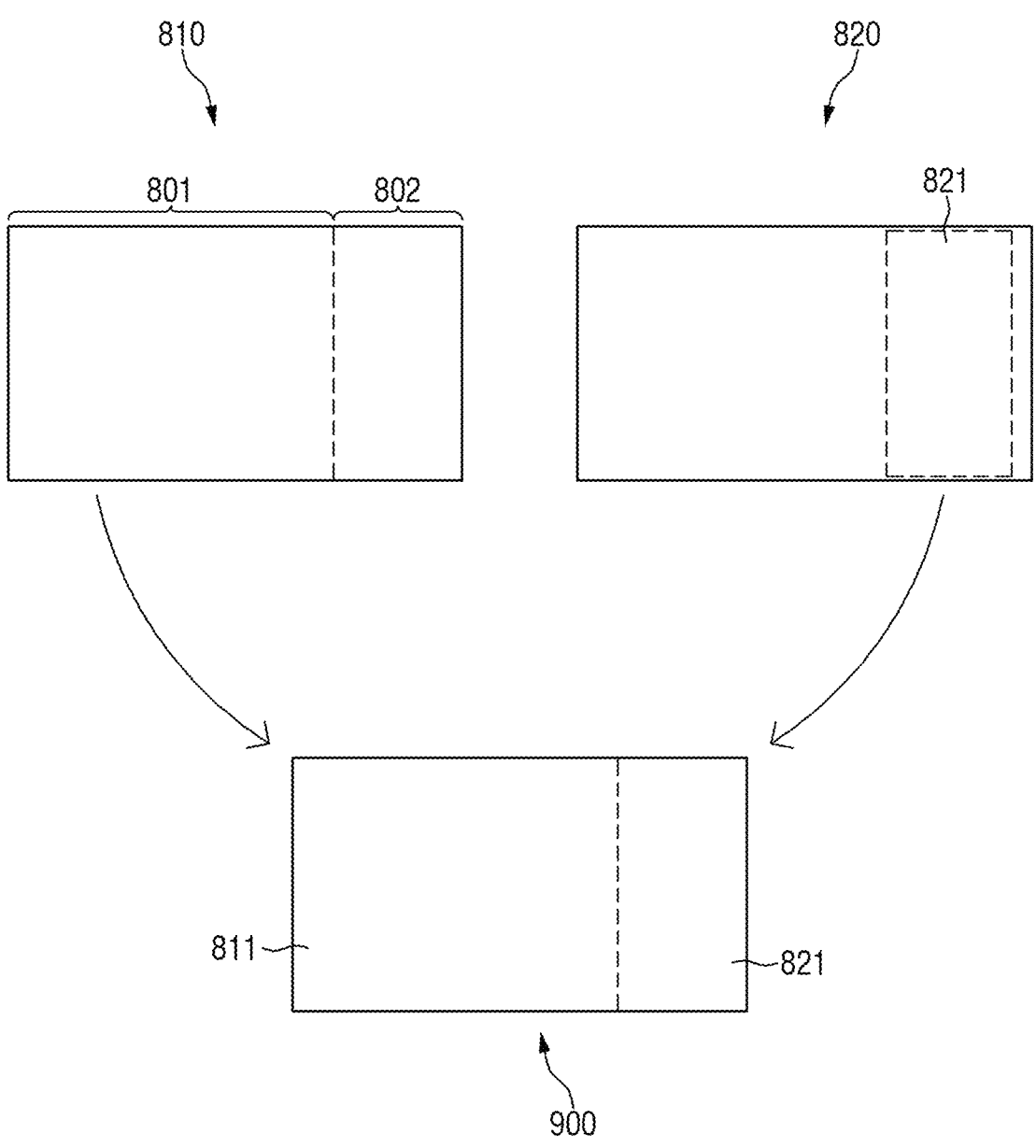
FIG. 6 depicts that a synthesized image is generated using a first image and a second image.

FIG. 6 depicts that a synthesized image is generated using a first image and a second image. Referring to FIG. 6, the control device 400 may be configured to generate a synthesized image 900 by synthesizing a reference image 811 extracted from a first image 810 and a modified image 821 extracted from a second image 820.

The main image processor 440 of the control device 400 may be configured to extract the reference image 811 and the modified image 821 from the first image 810 and the second image 820, respectively. The reference image 811 may include at least a portion of the first image 810, and the modified image 821 may include at least a portion of the second image 820.

The first image 810 may include a first reference area 801 and a second reference area 802. The first reference area 801 may represent a region that is not occupied by the image of the host vehicle 20, and the second reference area 802 may represent a region occupied by the image of the host vehicle 20.

The reference image 811 used for generating the synthesized image 900 may include an image extracted from the first reference area 801 and the second reference area 802 of the first image 810, or may include an image extracted from the first reference area 801. For example, the reference image 811 may include an entire area of the first image 810, or may include a partial area of the first image 810 excluding the second reference area 802 occupied by the image of the host vehicle 20 in the first image 810.

The modified image 821 used for generating the synthesized image 900 may include an image extracted from a partial area of the second image 820, which corresponds to the second reference area 802 of the first image 810. For example, the modified image 821 may include a partial area of the second image 820, which corresponds to the second reference area 802 occupied by the image with respect to the host vehicle 20 in the first image 810.

The first image 810 and the second image 820 may respectively include at least some portions that overlap with each other. When the reference image 811 and the modified image 821 are extracted by appropriately cutting (e.g., cropping) the overlapping portion, the objects may be blended seamlessly such that the boundaries in the reference image 811 and the modified image 821 are connected to one another.

The synthesized image 900 may include a reference image 811 and a modified image 821. The synthesized image 900 may be generated by overlaying the modified image 821 with the reference image 811, or by joining the boundary of the reference image 811 and the boundary of the modified image 821.

The main image processor 440 may be configured to extract the reference image 811 and the modified image 821 so that the sum of the size of the reference image 811 and the size of the modified image 821 corresponds to the size of the synthesized image 900. The synthesized image 900 formed by synthesizing the reference image 811 and the modified image 821 may be transmitted to the display device 500, and the display device 500 may output the synthesized image 900.

Figure 7:
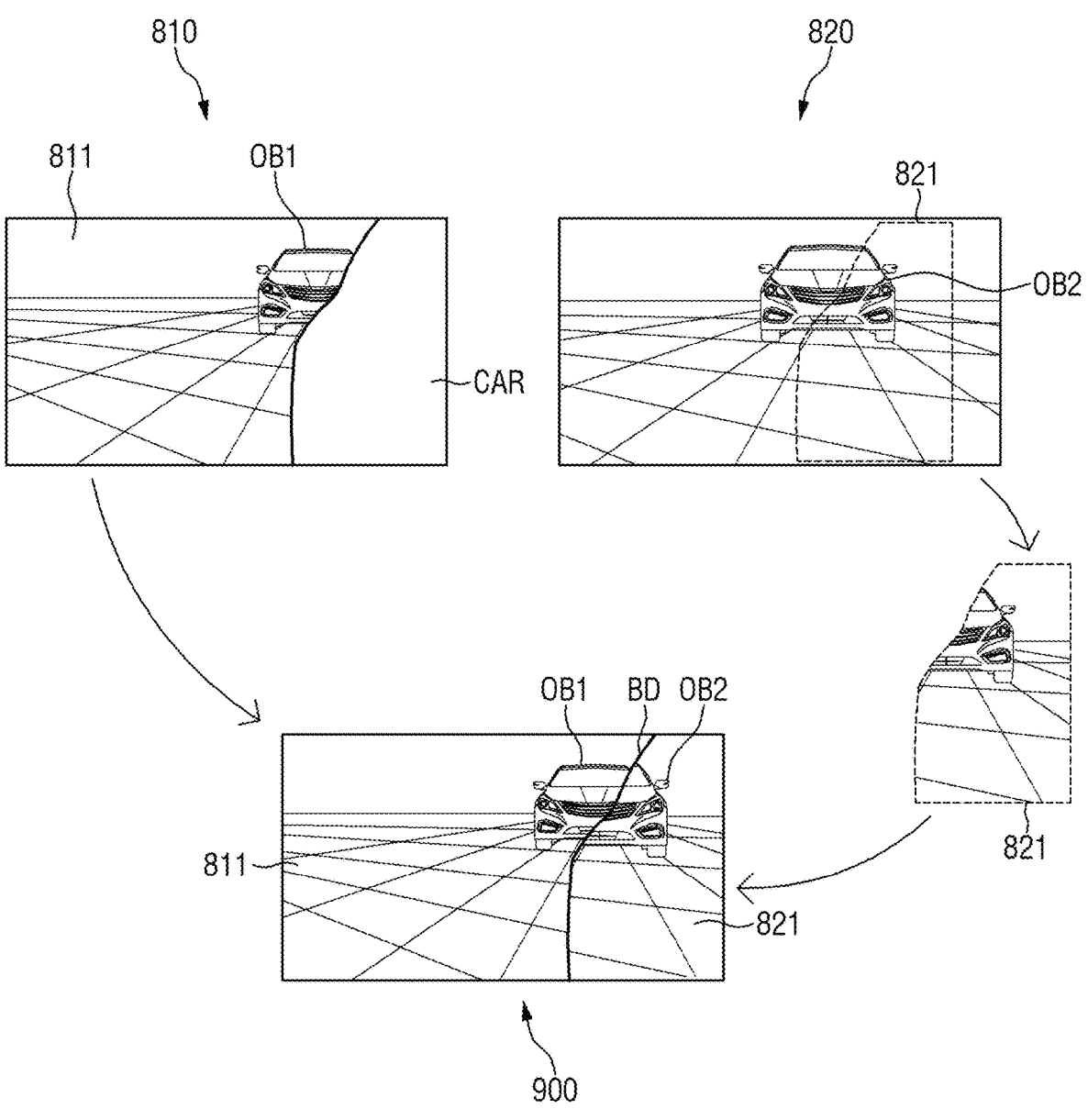
FIG. 7 shows an example where a synthesized image is generated using a second image before conversion.
Figure 8:
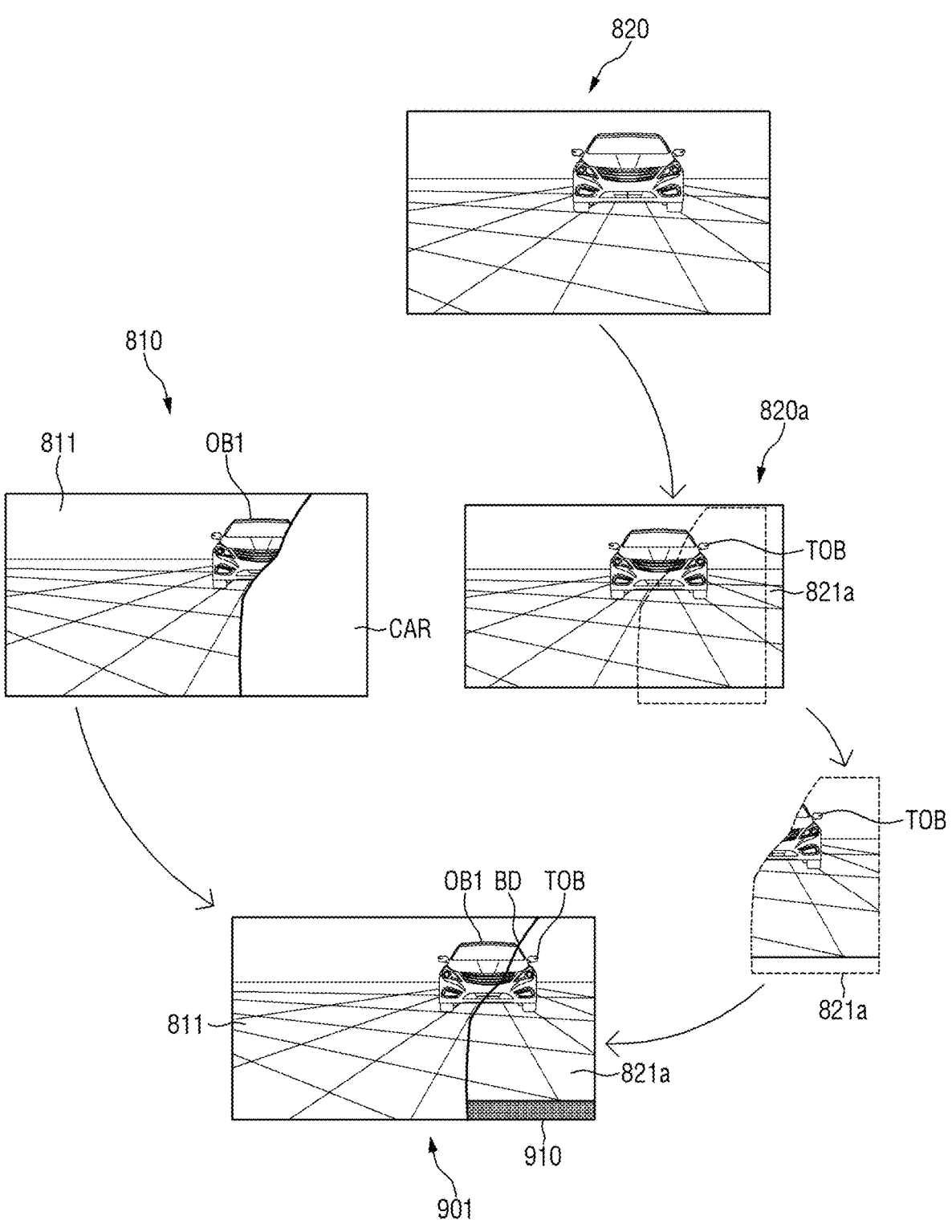
FIG. 8 shows an example where a synthesized image is generated using a converted second image.

FIG. 7 illustrates an example where a synthesized image is generated using a second image before conversion, and FIG. 8 illustrates an example where a synthesized image is generated using a converted second image.

Referring to FIG. 7, the reference image 811 and the modified image 821 may be synthesized to generate the synthesized image 900.

A boundary BD may be formed between the reference image 811 and the modified image 821. The first image 810 may include a host vehicle image CAR representative of the host vehicle 20. The boundary BD of the reference image 811 and the modified image 821 may be formed along an outline of the host vehicle image CAR of the host vehicle 20, and the outline of the host vehicle image CAR may be included in the synthesized image 900 so that it may be visible.

The control device 400 may be configured to generate the synthesized image 900 by synthesizing the reference image 811 extracted from the first reference area 801 of the first image 810 and the modified image 821 extracted from the second image 820.

The host vehicle image CAR of the host vehicle 20 may not be included in the first reference area 801 of the first image 810, whereas it may be included in the second reference area 802 of the first image 810. Accordingly, any objects included in the second reference area 802 may not be easily observed due to the host vehicle image CAR. In order to improve the field of view with respect to the second reference area 802, the control device 400 may be configured to extract the modified image 821 corresponding to the second reference area 802 from the second image 820 and use the extracted image to generate the synthesized image 900.

Meanwhile, when the conversion for the second image 820 is not performed, discontinuity may occur at the boundary BD between the reference image 811 and the modified image 821.

The first image 810 and the second image 820 may include objects OB1 and OB2. The object OB1 (hereinafter, referred to as a first object) included in the first image 810 and the object OB2 (hereinafter, referred to as a second object) included in the second image 820 may represent the same object. For example, the first object OB1 and the second object OB2 may be images of the counterpart vehicle 30 that is behind the host vehicle 20.

The first imaging device 100 and the second imaging device 200 may be disposed with different postures and/or at different positions of the host vehicle 20. In particular, the second imaging device 200 may be disposed closer to the rear of the host vehicle 20 than the first imaging device 100. Moreover, the first imaging device 100 and the second imaging device 200 may be different in terms of an installation position, angle of view, and specification thereof.

The first object OB1 and the second object OB2 may appear differently in terms of the shapes and arrangements due to the differences in the installation position, angle of view, and specification between the first imaging device 100 and the second imaging device 200.

As shown in FIG. 7, since the first object OB1 and the second object OB2 have heterogeneous shapes from each other, discontinuity may occur at the boundary BD between the reference image 811 and the modified image 821, and thus, the quality of the synthesized image 900 may be inferior.

To prevent the discontinuities from occurring at the boundary BD between the reference image 811 and the modified image 821, the main image processor 440 according to the embodiment of the present disclosure may be configured to extract a modified image 821a (see FIG. 8) after converting the second image 820.

Referring to FIG. 8, the synthesized image 901 may include a reference image 811 and a converted modified image 821a.

The control device 400 may be configured to convert the second image 820 so that the object OB1 included in the first image 810 and the object OB2 included in the second image 820 are matched with respect to the counterpart vehicle 30, and may be configured to generate the synthesized image 901 by synthesizing the reference image 811 extracted from the first image 810 and the modified image 821a extracted from the converted second image 820a.

The main image processor 440 of the control device 400 may be configured to extract one or more feature points of an object commonly included in the first image 810 and the second image 820 and generate a homography model based on the extracted feature point. The main image processor 440 may be configured to convert the second image 820 using the generated homography model. Due to the conversion of the second image 820, the shapes and arrangements of the first object OB1 and a second object TOB may appear more uniformly.

The main image processor 440 may be configured to extract the reference image 811 and the modified image 821a from the first image 810 and the converted second image 820a, respectively. The first object OB1 included in the reference image 811 and the second object TOB included in the converted modified image 821a may have a more consistent appearance.

The image synthesizer 460 may be configured to generate the synthesized image 901 by synthesizing the reference image 811 and the modified image 821a. Since the first object OB1 and the second object TOB have substantially the same shape and arrangement, any discontinuity may be prevented from occurring at the boundary BD between the reference image 811 and the modified image 821a.

As described above, the main image processor 440 may be configured to convert the second image 820 using the generated homography model. As the modified image 821a is extracted from the converted second image 820a, the synthesized image 900 may include an area 910 (hereinafter, referred to as an information-deficit area) in which image information is absent. The information-deficit area 910 represents an image region that is not included in the first imaging device 100 or the second imaging device 200. The synthesized image 900 including the information-deficit area 910 may be recognized as having a deteriorated quality.

In order to prevent the information-deficit area 910 from being displayed, the control device 400 may be configured to generate a synthesized image by overlapping a separate image with the information-deficit area 910. Hereinafter, the generation of the synthesized image in which the information-deficit area 910 is suppressed will be described in detail with reference to FIGS. 9 to 13.

Figure 9:
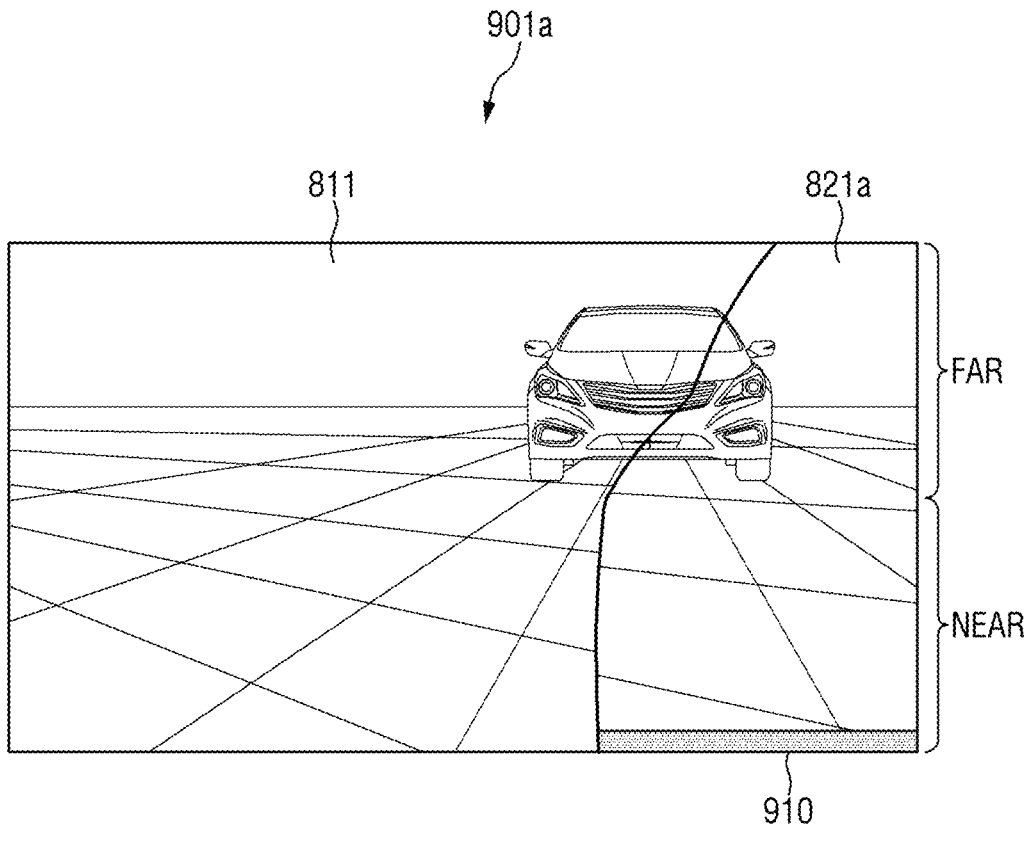
FIG. 9 shows an example where a synthesized image is generated using a second image converted with reference to the far field.
Figure 10:
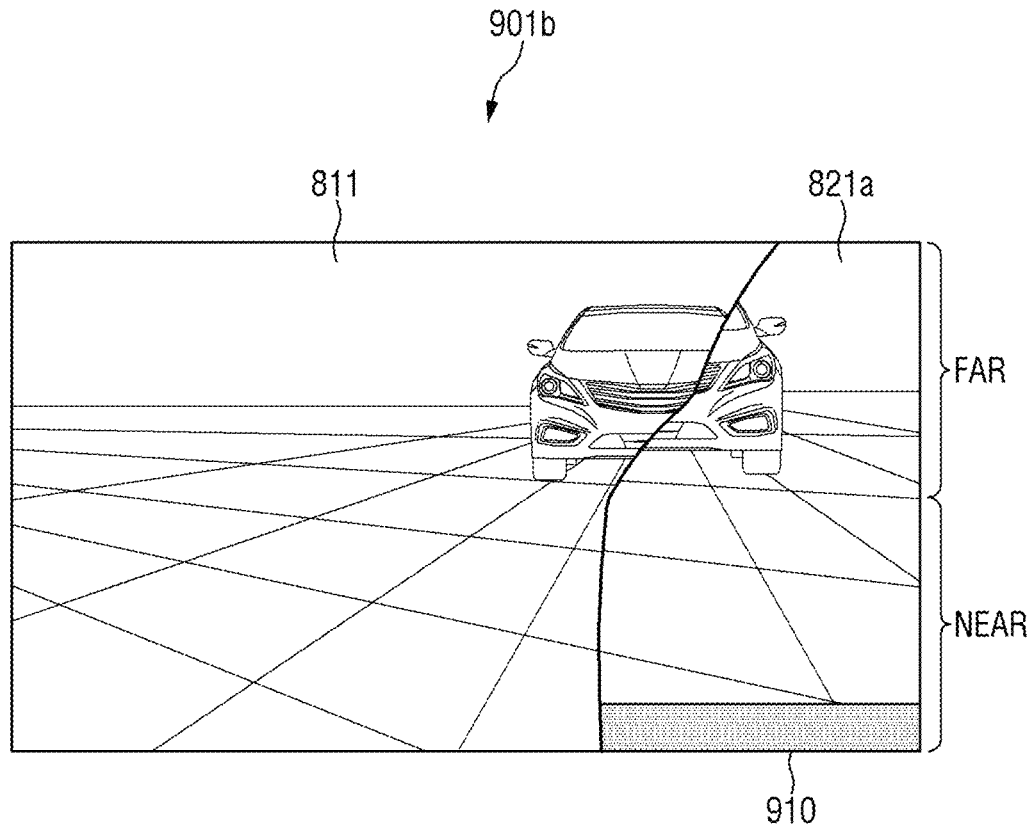
FIG. 10 shows an example where a synthesized image is generated using a second image converted with reference to the near field.

FIG. 9 illustrates an example where a synthesized image is generated using a second image converted with reference to the far field, and FIG. 10 illustrates an example where a synthesized image is generated using a second image converted with reference to the near field.

Referring to FIGS. 9 and 10, the quality of the synthesized image may be different depending on the conversion method of the second image 820.

As described above, the main image processor 440 of the control device 400 may be configured to convert the second image 820 by using a homography model. In this case, the main image processor 440 may be configured to convert the second image 820 based on a specific reference region of the second image 820. Different modified images 821a may be generated depending on the position of the conversion reference region for the second image 820.

Referring to FIG. 9, the main image processor 440 may be configured to generate a synthesized image 901a by converting the second image 820 based on an area FAR corresponding to the far field with respect to the host vehicle 20. When the second image 820 is converted based on the far field reference, the area FAR corresponding to the far field within the modified image 821a may appear to be matched with the reference image 811. Conversely, an area NEAR corresponding to the near field may appear unmatched with the reference image 811.

On the other hand, referring to FIG. 10, the main image processor 440 may be configured to generate a synthesized image 901b by converting the second image 820 based on the area NEAR corresponding to the near field with respect to the host vehicle 20. When the second image 820 is converted based on the near field reference, the area NEAR corresponding to the near field within the modified image 821a may appear to be matched with the reference image 811. Conversely, the area FAR corresponding to the far field may appear unmatched with the reference image 811.

The main image processor 440 may be configured to convert the second image 820 by referring to the position of the object included in the second image 820. For example, when the nearby vehicle is included in the second image 820, the main image processor 440 may be configured to convert the second image 820 based on the position of the corresponding vehicle. Consequently, the corresponding vehicle may appear more normally in the synthesized images 901a and 901b.

Meanwhile, even though the second image 820 is converted based on the distance to the object, the information-deficit area 910 may be still displayed on the synthesized images 901a and 901b. In particular, the size of the information-deficit area 910 may vary depending on the conversion method of the second image 820.

The main image processor 440 may be configured to map the reference image extracted from the first image 810 to a corresponding area of the synthesized images 901*a* and 901*b* in which the information-deficit area 910 is formed. Consequently, the information-deficit area 910 may be prevented.

Figure 11:
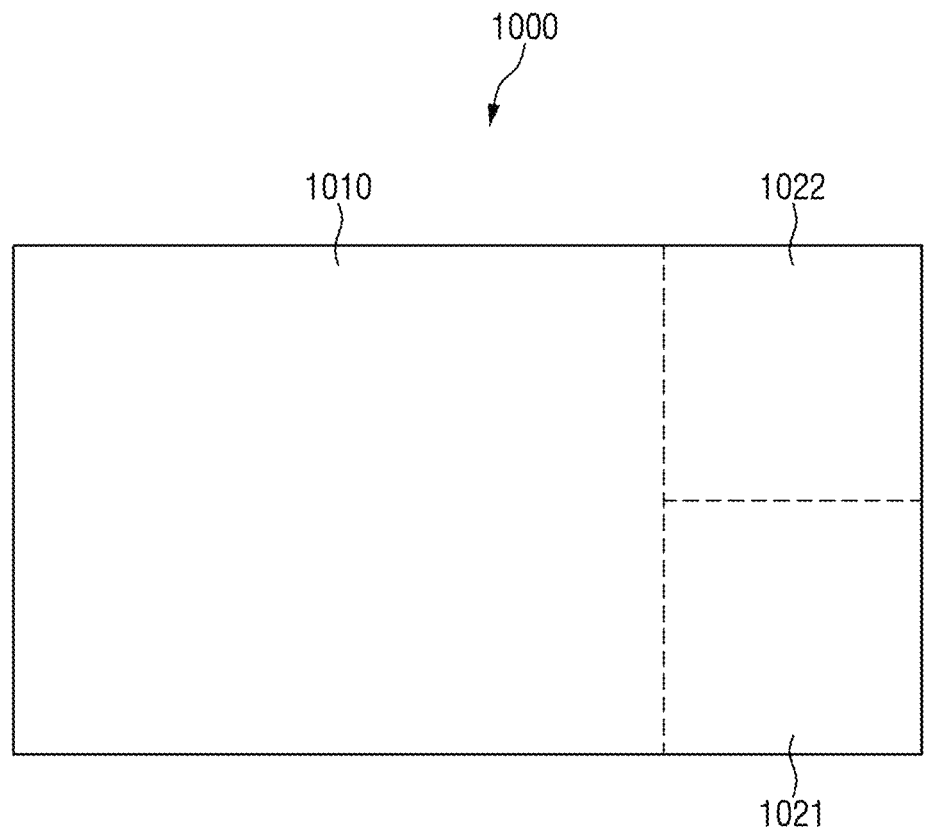
FIG. 11 illustrates a synthesized image divided into a plurality of areas.

FIG. 11 illustrates a synthesized image divided into a plurality of areas. Referring to FIG. 11, the control device 400 may be configured to divide the entire area of the synthesized image 1000 into a base synthesis area 1010 and modified synthesis areas 1021 and 1022.

The base synthesis area 1010 may correspond to the first reference area 801 that is not occupied by the host vehicle image CAR of the host vehicle 20 in the first image 810. The modified synthesis areas 1021 and 1022 may correspond to the second reference area 802 occupied by the host vehicle image CAR in the first image 810. The base synthesis area 1010 and the modified synthesis areas 1021 and 1022 may be disposed along the horizontal direction. A boundary between the base synthesis area 1010 and the modified synthesis areas 1021 and 1022 may correspond to the outline of the host vehicle image CAR.

Further, the modified synthesis areas 1021 and 1022 may include a first modified synthesis area 1021 and a second modified synthesis area 1022. The first modified synthesis area 1021 and the second modified synthesis area 1022 may be disposed in a vertical direction, and the first modified synthesis area 1021 may be disposed below the second modified synthesis area 1022. In general, the information-deficit area 910 may be formed at the bottom of the synthesized image 1000. As such, the information-deficit area 910 may occur in the first modified synthesis area 1021.

The control device 400 may be configured to generate the synthesized image 1000 by synthesizing the reference image 811 extracted from the first image 810 and a modified image 821*b* extracted from the second image 820. In more detail, the control device 400 may be configured to map (e.g., assign) a portion of the reference image 811 that does not include the host vehicle image CAR to the base synthesis area 1010, to map a portion of the reference image 811 that includes the host vehicle image CAR to the first modified synthesis area 1021, and to maintain display of the host vehicle image CAR included in the first modified synthesis area 1021. As the host vehicle image CAR is displayed in the first modified synthesis area 1021, the information-deficit area 910 may be prevented.

Further, the control device 400 may be configured to map the modified image 821*b* extracted from the second image 820 to the second modified synthesis area 1022. In more detail, the control device 400 may be configured to map the modified image 821*b* extracted from the converted second image 820*a* to the second modified synthesis area 1022. The control device 400 may be configured to use the entire area of the first image 810 as the reference image 811. In this case, the host vehicle image CAR may be included in the second modified synthesis area 1022. When the host vehicle image CAR is included in the second modified synthesis area 1022, the control device 400 may be configured to overlay (e.g., superimpose) the modified image 821*b* with the host vehicle image CAR included in the second modified synthesis area 1022. Therefore, the modified image 821*b* may be observed through the second modified synthesis area 1022. Meanwhile, according to some embodiments of the present disclosure, the control device 400 may be configured to remove an area corresponding to the second modified synthesis area 1022 from the first image 810 as the reference image 811. In this case, the synthesized image 1000 may be generated by mapping the modified image 821*b* to the second modified synthesis area 1022.

The main image processor 440 of the control device 400 may be configured to convert the second image 820 based on the position of the object included in the second image 820. In this case, the remaining area of the second image 820, which is not set as the conversion reference by the main image processor 440, may not be matched with the reference image 811. The area extracted by the main image processor 440 from the second image 820 may correspond to an area including an object set as the conversion reference, and the modified image 821*b* may not include a portion that is not matched with the reference image 811.

Figure 12:
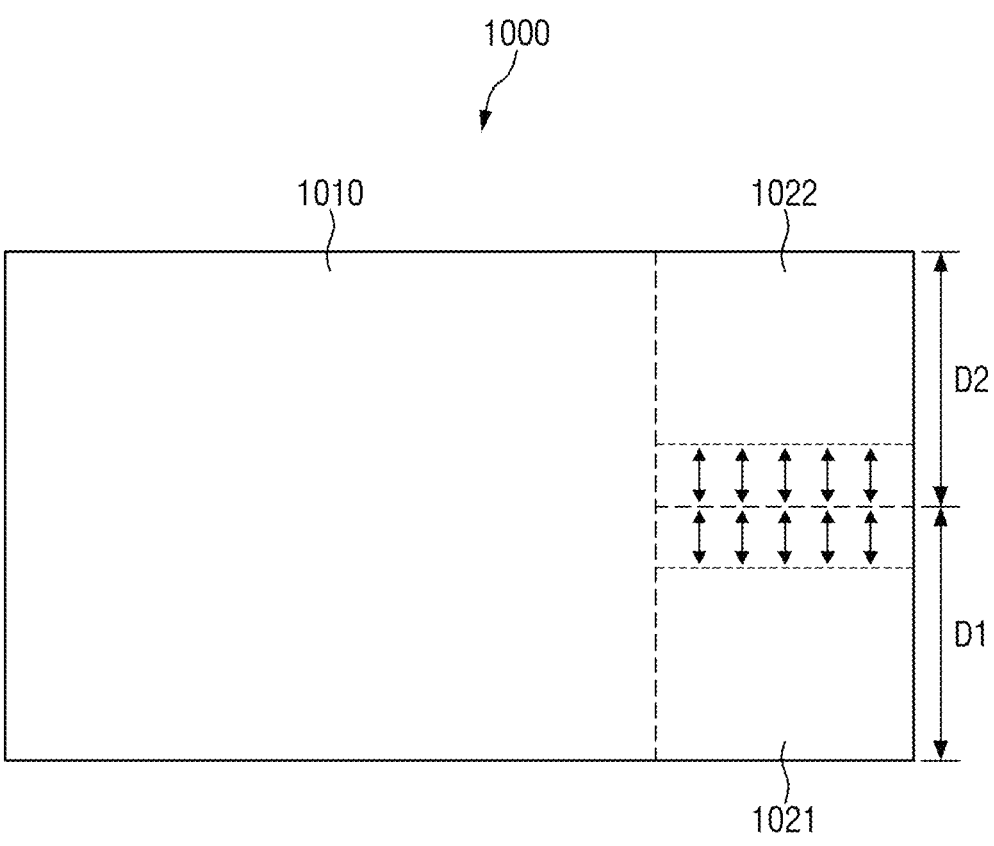
FIG. 12 illustrates that a boundary between a first modified synthesis area and a second modified synthesis area is changed.

FIG. 12 illustrates that a boundary between a first modified synthesis area and a second modified synthesis area is changed. Referring to FIG. 12, the vertical location of the boundary between the first modified synthesis area 1021 and the second modified synthesis area 1022 may be adjusted based on the distance between the counterpart vehicle 30 and the host vehicle 20.

As the boundary between the first modified synthesis area 1021 and the second modified synthesis area 1022 is adjusted, the ranges of synthesis between the first modified synthesis area 1021 and the second modified synthesis area 1022 may be adjusted, and vertical lengths D1 and D2 (e.g., heights) of the first modified synthesis area 1021 and the second modified synthesis area 1022 may be adjusted.

When the main image processor 440 converts the second image 820 based on the position of the object included in the second image 820, the size of the area that is not matched (e.g., aligned) with the reference image 811 may be varied depending on the position that becomes a conversion reference. The main image processor 440 may be configured to extract only a portion that is matched with the reference image 811 from the second image 820 to generate a modified image and to determine the dimensions D1 and D2 of the first modified synthesis area 1021 and the second modified synthesis area 1022 by referring to the size of the generated modified image.

Figure 13:
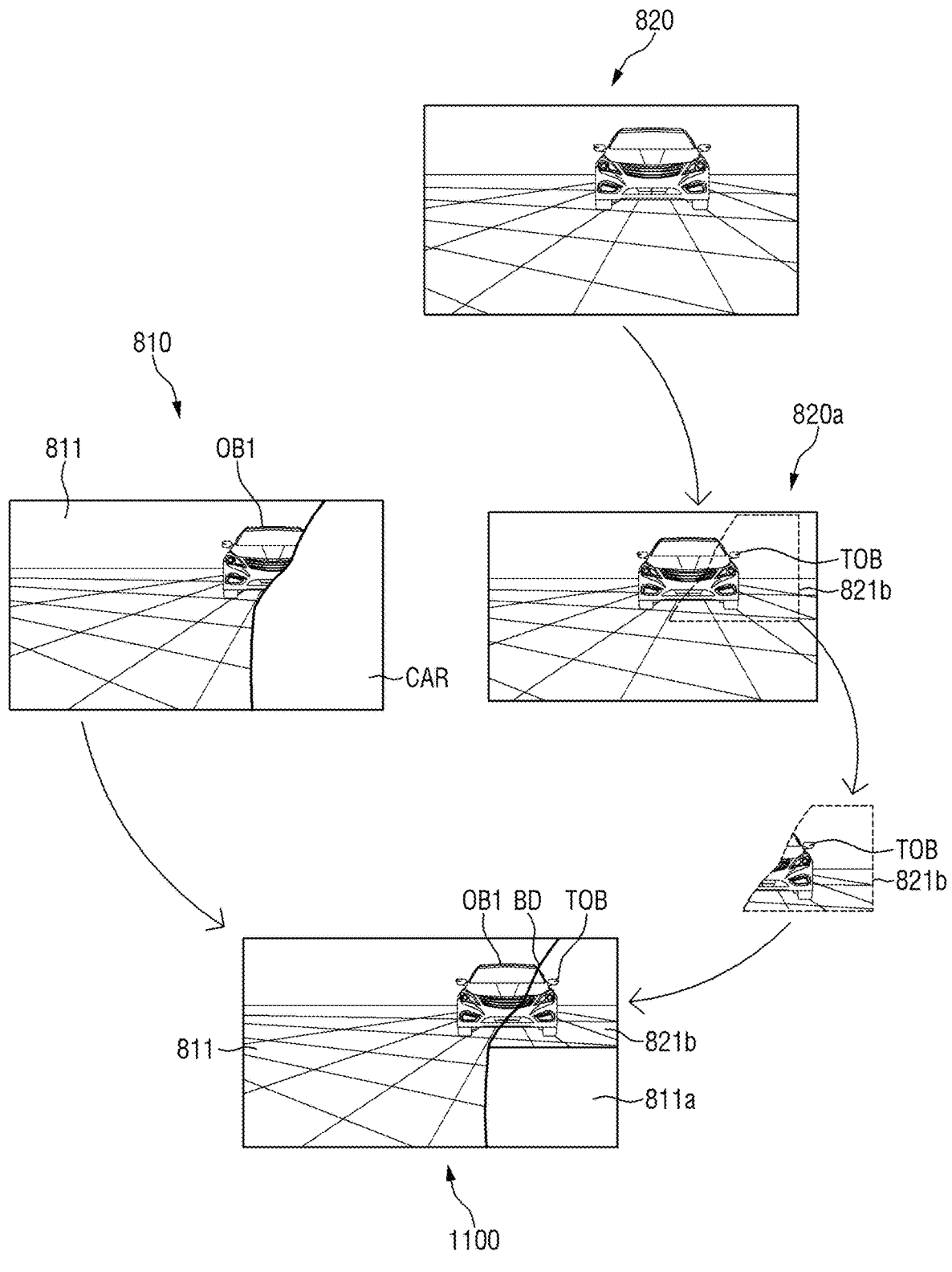
FIG. 13 shows an example where a synthesized image is formed by overlapping a modified image with a reference image.

FIG. 13 shows an example where a synthesized image is formed by overlapping a modified image with a reference image. Referring to FIG. 13, the control device 400 may be configured to generate a synthesized image 1100 by overlapping the modified image 821*b* with the reference image 811. Herein, the terms "overlapping," "overlaying," and variations thereof may refer to superimposing a layer of image over another. While doing so, the top layer (i.e., overlaying layer) may or may not retain transparency. If the overlaying layer retains transparency, the underlaying layer may be visible through the overlaying layer. If the overlaying layer is opaque, the underlaying layer may be invisible.

The control device 400 may be configured to map the modified image 821*b* extracted from the second image 820 to the second modified synthesis area 1022 (see FIG. 11). The object OB1 included in the reference image 811 and the object TOB included in the modified image 821*b* may be displayed in the second modified synthesis area 1022.

The control device 400 may be configured to cut the modified image 821*b* to maintain a vehicle outline of the host vehicle image CAR included in the second modified synthesis area 1022 and map the cut image 821*b* to the second modified synthesis area 1022. The control device 400 may be configured to analyze the reference image 811 to identify the outline of the host vehicle 20. Furthermore, the control device 400 may be configured to extract the modified image 821*b* from the second image 820*a* converted by referring to the identified outline of the host vehicle 20 and map the extracted modified image 821*b* to the second modified synthesis area 1022.

Accordingly, the driver may more easily check the relative positional relationship between the host vehicle 20 in which the driver is on-board and the adjacent vehicle behind the host vehicle 20 through the synthesized image 1100.

A portion 811*a* (hereinafter, referred to as a host vehicle portion) including the host vehicle image CAR in the reference image 811 may be mapped to the first modified synthesis area 1021. The control device 400 may be configured to adjust a vertical length of the host vehicle portion 811*a* and the modified image 821*b* based on the distance to the object corresponding to the objects OB1 and TOB included in the first image 810 or the second image 820. Therefore, the object OB1 of the reference image 811 and the object TOB of the modified image 821*b*, which are displayed in the second modified synthesis area 1022, may be displayed to be matched with each other.

Figure 14:
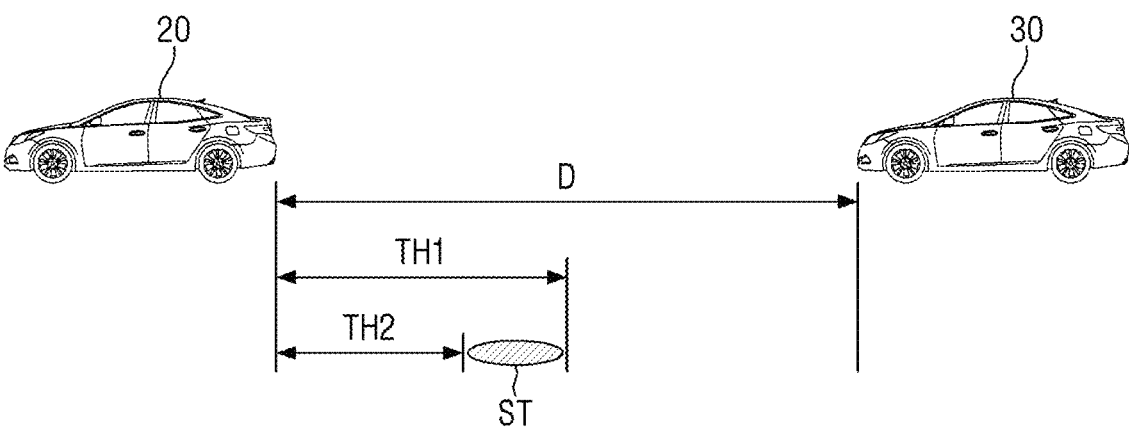
FIG. 14 illustrates an operation depending on a distance between a host vehicle and a counterpart vehicle.

FIG. 14 illustrates an operation depending on a distance between a host vehicle and a counterpart vehicle. Referring to FIG. 14, the control device 400 may be configured to generate the synthesized image 1100 by referring to a distance (vehicle distance) D between the host vehicle 20 and the counterpart vehicle 30. In this case, the counterpart vehicle 30 may be a nearby or adjacent vehicle that is behind the host vehicle 20. In detail, the counterpart vehicle 30 may be an adjacent vehicle corresponding to an object included in the first image 810 and the second image 820. The vehicle distance D may be checked by analyzing the third image generated by the auxiliary sensor 300 or by using a separate distance sensor.

The control device 400 may be configured to determine whether to generate the synthesized image 1100 with reference to the vehicle distance D. The control device 400 may be configured to generate the synthesized image 1100 when the distance D between the counterpart vehicle 30 and the host vehicle 20, which corresponds to the object commonly included in the first image 810 and the second image 820, falls within a first threshold distance TH1. Further, the control device 400 may be configured to continue generating the synthesized image 1100 until the vehicle distance D falls within a second threshold distance TH2. Thereafter, the control device 400 may be configured to stop generating the synthesized image 1100 when the vehicle distance D falls within the second threshold distance TH2. Here, the second threshold distance TH2 may be shorter than the first threshold distance TH1. Hereinafter, the range of distance within which the repetition of generation and interruption of the synthesized image 1100 is prevented will be referred to as a conversion prevention range ST.

The first imaging device 100 may continuously operate while the host vehicle 20 is driving, and the second imaging device 200 and the auxiliary sensor 300 may operate only when the synthesized image 1100 is generated by the control device 400. In other words, when the vehicle distance D falls within the conversion prevention range ST, the second imaging device 200 and the auxiliary sensor 300 may operate to generate the synthesized image 1100.

When the synthesized image 1100 is generated by the control device 400, the display device 500 may display the synthesized image 1100, and when the synthesized image 1100 is not generated by the control device 400, the display device 500 may display one of the first image 810, the second image 820, or the third image.

Figure 15:
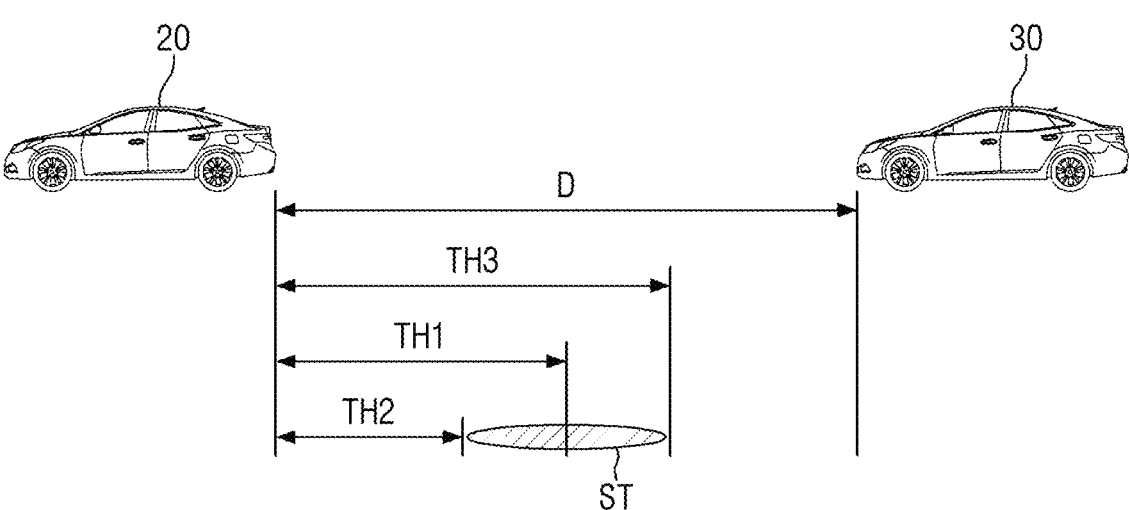
FIG. 15 illustrates another operation depending on a distance between a host vehicle and a counterpart vehicle.

FIG. 15 illustrates another operation depending on a distance between a host vehicle and a counterpart vehicle. The control device 400 may be configured to generate a synthesized image 1100 when the vehicle distance D falls within a preset range between the second threshold distance TH2 and a third threshold distance TH3, and may be configured to not generate the synthesized image 1100 when the vehicle distance D is out of the range between the second threshold distance TH2 and the third threshold distance TH3.

In this case, the control device 400 may be configured to maintain the generation of the synthesized image 1100 when the vehicle distance D is included in the range of the second threshold distance TH2 and the third threshold distance TH3 in the state where the synthesized image 1100 is being generated, and may be configured to stop the generation of the synthesized image 1100 in response to the vehicle distance D falling out of the range of the second threshold distance TH2 and the third threshold distance TH3. In other words, the control device 400 may be configured to stop the generation of the synthesized image 1100 when the vehicle distance D is out of the conversion prevention range ST.

If the vehicle distance D is similar to the second threshold distance TH2 or the third threshold distance TH3, the generation and interruption of the synthesis image 1100 may be repeated within a short time, potentially leading to a concern for unnecessarily frequent conversion between the first image 810 and the synthesis image 1100 on the display device 500.

Since such frequent conversion may be undesirable and/or inconvenient, the control device 400 may be configured to use the first threshold distance TH1 included between the second threshold distance TH2 and the third threshold distance TH3. The first threshold distance TH1 may be greater than the second threshold distance TH2, and may be smaller than the third threshold distance TH3.

As such, the control device 400 may be configured to initiate the generation of the synthesized image 1100 in response to the vehicle distance D falling within the first threshold distance TH1 from being greater than the third threshold distance TH3. Further, the control device 400 may be configured to initiate the generation of the synthesized image 1100 in response to the vehicle distance D exceeding the first threshold distance TH1 from being smaller than the second threshold distance TH2. First, when the vehicle distance D is within the conversion prevention range ST in a state that the generation of the synthesized image 1100 has been initiated, the control device 400 may be configured to maintain the generation of the synthesized image 1100. Meanwhile, when the vehicle distance D falls out of the conversion prevention range ST in a state that the generation of the synthesized image 1100 has been initiated, the control device 400 may stop the generation of the synthesized image 1100.

As the control device 400 is configured to avoid excessive repetition of the generation and stopping of the synthesis image 1100 at the boundary of the conversion prevention range ST, unnecessary conversions between the first image 810 and the synthesis image 1100 on the display device 500 may be avoided.

Although it has been described that the control device 400 is configured to determine whether to generate the synthesized image 1100 with reference to the vehicle distance D, according to some embodiments of the present disclosure, whether to generate the synthesized image 1100 may be determined by the driver. In such embodiments, regardless of the vehicle distance D, the control device 400 may be configured to generate the synthesized image 1100 or stop the generation of the synthesized image 1100 by the driver's intervention.

Although the embodiments of the present disclosure have been described with reference to the above and the accompanying drawings, those of ordinary skill in the art, to which the present disclosure pertains, may understand that the present disclosure may be implemented in other forms without changing the technical spirit or essential features. Therefore, it should be understood that the embodiments described above are illustrative only and non-limiting in any respects.

What is claimed is:

1. A system for monitoring surroundings of a vehicle, comprising:

a first imaging device provided on a side of a host vehicle to generate a first image of side and rear directions of the host vehicle;

a second imaging device provided on a rear of the host vehicle to generate a second image of the rear direction of the host vehicle; and a control device configured to generate a synthesized image by synthesizing a reference image extracted from the first image and a modified image extracted from the second image, wherein the control device is configured to generate the synthesized image in response to a distance between a counterpart vehicle corresponding to an object commonly included in the first image and the second image and the host vehicle becoming less than or equal to a first threshold distance by:

dividing an area occupied by a host vehicle image of the host vehicle in the first image into a first modified synthesis area and a second modified synthesis area;

maintaining the host vehicle image to be included in the first modified synthesis area; and mapping the modified image to the second modified synthesis area.

2. The system of claim 1, wherein the control device comprises a main image processor configured to extract the reference image and the modified image from the first image and the second image, respectively, and wherein the main image processor is configured to:

extract one or more feature points of the object commonly included in the first image and the second image;

generate a homography model based on the extracted feature points;

convert the second image using the generated homography model; and extract the reference image and the modified image from the first image and the converted second image, respectively.

3. The system of claim 1, wherein the control device is configured to:

convert the second image to allow the object included in the first image and the object included in the second image to be matched with respect to the counterpart vehicle; and generate the synthesized image by synthesizing the reference image extracted from the first image and the modified image extracted from the converted second image.

4. The system of claim 1, wherein the first modified synthesis area and the second modified synthesis area are disposed in a vertical direction, and wherein the first modified synthesis area is disposed below the second modified synthesis area.

5. The system of claim 4, wherein a vertical position of a boundary between the first modified synthesis area and the second modified synthesis area is adjusted based on a distance between the counterpart vehicle and the host vehicle.

6. The system of claim 1, wherein the control device is configured to overlay the modified image with the host vehicle image and allow a resulting image to be included in the second modified synthesis area.

7. The system of claim 1, wherein the control device is configured to cut the modified image so that a vehicle outline of the host vehicle image included in the second modified synthesis area is maintained, and map the cut image to the second modified synthesis area.

8. The system of claim 1, wherein the first image and the second image include at least some areas that are overlapped with each other.

9. The system of claim 1, wherein the second imaging device generates the second image by capturing images of a vicinity of the host vehicle with a wider angle of view than the first imaging device.

10. The system of claim 1, wherein the control device is configured to stop generating the synthesized image in response to the distance between the counterpart vehicle and the host vehicle becoming less than or equal to a second threshold distance, which is smaller than the first threshold distance.

11. The system of claim 1, wherein, in a state in which the synthesis image is being generated, the control device is configured to maintain generating the synthesized image while the distance between the counterpart vehicle and the host vehicle is greater than or equal to a second threshold distance, which is smaller than the first threshold distance, and less than or equal to a third threshold distance, which is greater than the first threshold distance, and wherein the control device is configured to stop generating the synthesized image in response to the distance becoming smaller than the second threshold distance or greater than the third threshold distance.

* * * * *